Figure 1:
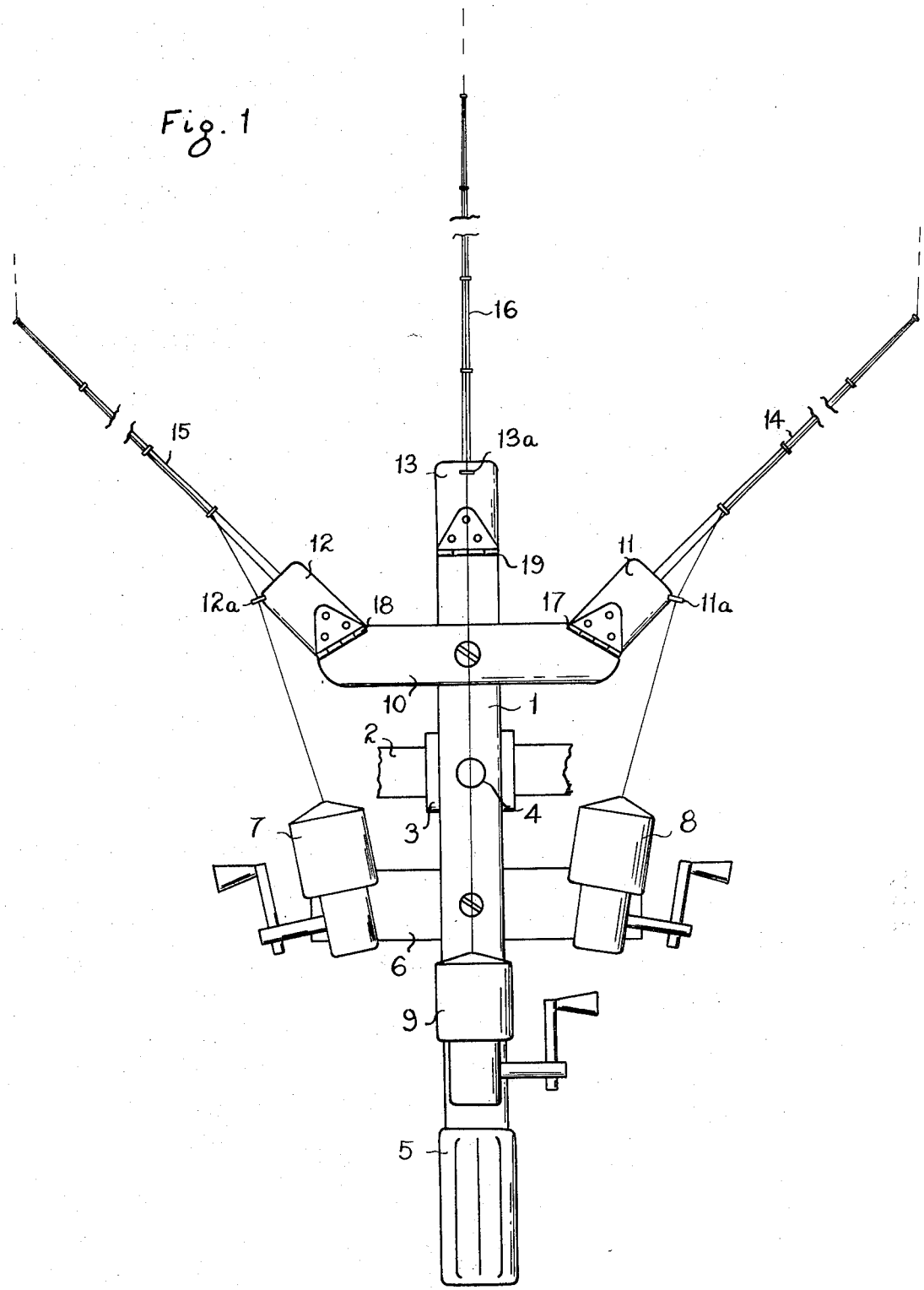

United States Patent [19]
Ridge

[11] 3,772,816
[45] Nov. 20, 1973

[54] MULTIPLE FISHING POLE DEVICE

[76] Inventor: Ray H. Ridge, P.O. Box 386, Trenton, Ga. 30752

[22] Filed: Sept. 27, 1972

[21] Appl. No.: 292,820

[52] U.S. Cl. .................................. 43/21.2, 248/42
[51] Int. Cl. ............................................ A01k 97/10
[58] Field of Search ...................... 43/20, 21.2, 22; 248/41, 42, 46

[56] References Cited
UNITED STATES PATENTS

| | | | |
|---|---|---|---|
| 3,159,366 | 12/1964 | Knight | 43/21.2 X |
| 3,385,544 | 5/1968 | Barnett | 43/21.2 UX |
| 3,411,231 | 11/1968 | Philbrick | 43/21.2 |
| 3,568,352 | 3/1971 | Hill | 43/21.2 X |
| 3,653,617 | 4/1972 | Saternus | 248/42 |

Primary Examiner—Louis G. Mancene
Assistant Examiner—James H. Czerwonky
Attorney—Ralph E. Parker et al.

[57] ABSTRACT

A fishing device which may be attached to a boat for supporting a plurality of rods in a divergent relation when fishing so that each rod may be independently raised for removal of fish. The device is arranged so that all of the rods may be folded back onto the device in a compact form when it is desired to carry or transport the device. The rods are supported within hinged rod support means spaced along a cross member. The cross member is mounted on a main support member, and the hinges are disposed at an angle to the axis of both the cross member and the main support member.

7 Claims, 3 Drawing Figures

PATENTED NOV 20 1973 3,772,816

SHEET 2 OF 2

MULTIPLE FISHING POLE DEVICE

The fishing device according to the present invention is designed for use on any small fishing boat, such as a row boat or the like to permit the fisherman to employ several lines at the same time and thus increase his catch and his pleasure. The present device is particularly useful when trolling or "drift fishing" as is sometimes customary in certain inland waters. It may also be used for still fishing, deep sea fishing and dock fishing. Drift fishing may be carried on by positioning the boat so that any wind or breeze will cause the boat to drift through the water without the need for an outboard motor or the like, as is used in trolling. When used for trolling it is sometimes desirable to use only one line and in such case the extra lines may be removed.

According to the present invention several fishing rods are used. When one employs this device it is attached to the side or stern of a boat, the fishing rods are extended out over the water and the lines are baited and run out from the ends of the rods to the desired depth. When a "strike" occurs the angler may reel in some of the line if desired and then raise the fishing rod to a substantially vertical position which will place the fish near the side of the boat and within easy reach of the angler so that it can be removed from the hook. The hook may then be rebaited, and rod lowered to its extended position and the line run out to the desired depth. Thus one angler may easily control three or more separate lines independently of each other without moving his position in the boat, with the minimum of difficulty and without fouling the lines. The device may be secured to the stern of a boat if desired when trolling or to the side of the boat if desired when "drift fishing."

When fishing is completed, the device may be removed from the boat after the rods have been folded back upon the device to make it compact and easy to carry.

Figure 2:
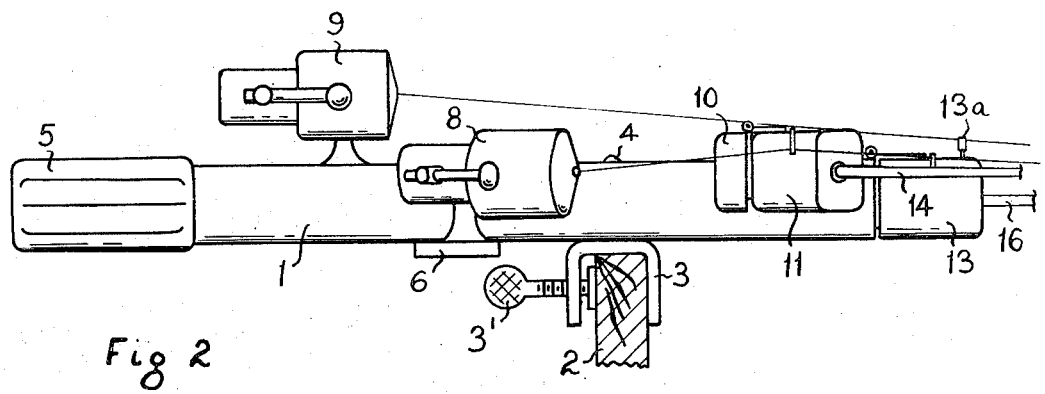
Figure 3:
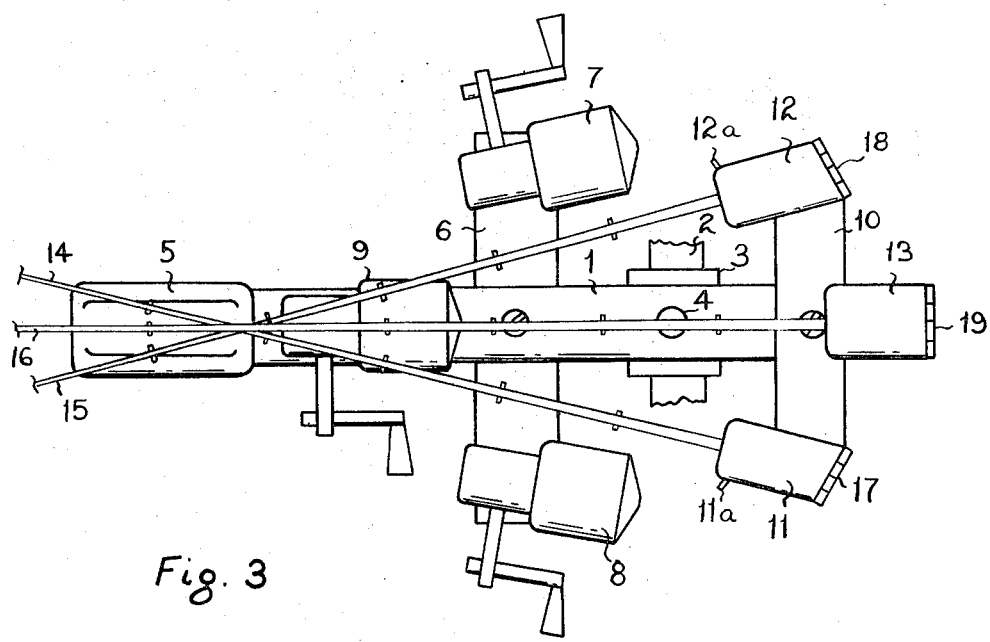

One embodiment of the invention will now be described with reference to the attached drawings in which, FIG. 1 is a plan view of the device with the fishing rods in an extended divergent position for fishing, FIG. 2 is a side elevational view of the device shown in FIG. 1, and FIG. 3 is a plan view of the device with the rods folded back in a compact position for ease in transporting the device.

With reference to FIG. 1, a main central support member is shown at 1. A clamp member 3 is attached to the underside of the main support 1 for securing the device to the side or stern of a boat such as a rowboat or other small fishing boat as at 2. The main support 1 is preferably made of wood, plastic or a light weight metal, such as aluminum, or other relatively light weight substantially rigid material. The clamp 3 may be rigidly fixed to the support 1 by a pin 4 or may be pivotally mounted thereto for purposes to be explained later.

The clamp may be secured to the edge of the boat by, for example, a thumb screw 3', as shown in FIG. 2. A hand grip 5 may be provided at the inner end of the support 1 for ease in handling the device. A reel support member 6 is attached to the support 1 on the underside thereof, as shown, or on top of the support 1. The member 6 extends transversely of the axis of the support 1 and conventional reels or spinners 7 and 8 are attached thereto adjacent the ends thereof. The support 6 may be longer than as shown to accommodate additional reels if desired when additional rods are employed. The reel support 6 is located between the clamp 3 and the hand grip 5 and is thus disposed inside the boat when the device is mounted thereon. An additional reel 9 may be mounted on the main support member 1 when a central rod is employed as shown in the drawings. It will be understood that the relative positions of the reel 9 and the reel support member 6 may be reversed if desired. As shown the axes of the reels 7 and 8 are disposed at a slight angle to the axis of the main support 1 so as to avoid sharp bends in the fishing line as it passes to the fishing rods. The axes of reels 7 and 8 may be disposed parallel to the axis of support 1 if desired. Instead of the "spinner" type reels as shown, conventional reels may also be used.

A transverse cross member 10 is attached to the support member 1 adjacent the outer end thereof and outside the clamp 3 so as to be disposed outside of the boat when the device is mounted thereon. Rod support members 11 and 12 are mounted at the ends of the cross member 10 and a third rod support member 13 is mounted at the end of the main support 1. Each of the rod support members are provided with means for releasably holding a fishing rod. As shown in the drawings the rod support members are provided with holes for frictionally engaging the rod to hold it in position. Alternatively if desired, any other means for releasably holding a rod may be used. Also sleeves of different diameters to accommodate rods of different diameters may be provided for insertion into the holes in the rod support members.

The rod supports 11 and 12 are hingedly mounted at the ends of the cross member 10 so that the fishing rods can be raised from their extended divergent positions as shown in FIG. 1, first to a vertical position as previously explained, and then folded backwards onto the device for compactness in transporting the device. As shown best in FIGS. 1 and 3 the axes of the hinges 17 and 18 for the rod support members 11 and 12 respectively are disposed at an angle to the axis of the cross member and also at an angle other than normal to the axes of the fishing rods supported by the rod support members. These angles are determined so that the fishing rods 14 and 15 will, when extended for fishing, be at substantial diverse angles to the axis of the main support member 1. As shown the rods extend at an angle of about 45°, although other angles may be employed, such as 30° or 60°, or intermediate angles. The latter angles may be employed when more than two diversely arranged fishing rods are to be mounted on the cross member 10, such as two on each side of the support 1. The axis of the hinge 19 for the rod support member 13 is preferably disposed at right angles to the axis of the main support 1. The axes of the hinges 17 and 18 as seen best in FIGS. 1 and 3, are disposed at an angle of about 30° to the axis of the cross member 10 and at about 15° to a normal to the axes of the fishing rods in the rod support members 11 and 12. It will be understood that these angles may vary somewhat depending upon the length of the fishing rods employed, the desired angle when extended, the desired angle when folded back as well as the length of the cross member 10 and its position on main support 1. However, as shown in the drawings, the hinges 17 and 18 will cause the fishing rods to assume an angle of about 15° with the axis of the main support member 1 when they are folded back as shown in FIG. 3. As shown the rods will cross the main support 1 at a point adjacent the hand grip 5. If desired, the angles of the hinges 17 and 18 may be such as to cause the rods, when folded back, to intersect at a point further inward along the axis of the support 1 or even near the tips of the rods 11, 12 and 13. In this manner the rods when folded back will assume a compact form for transport and will be far less likely to catch or snag on surrounding obstructions while being carried.

When used the device is fastened to the side or stern of a boat by the clamp 3 and the rods 14, 15 and 16 are extended out over the water. The fishing line is passed from the reels 7, 8 and 9 first through eyelets 11a, 12a and 13a respectively and then through the conventional eyelets provided on the fishing rods. The line is then adjusted to the desired depth for fishing. When there is a "strike" the line may be reeled in part way if necessary and the tip of the rod may be easily raised by rotating the rod upwardly about the hinge until it is substantially vertical whereby the fish will be swung over the boat and is thus easily accessible for removal from the hook. Any conventional resilient detent means may be used to hold the rod in the vertical position. The hook is then rebaited, the rod lowered to its extended position and the line let out as desired. With a plurality of rods, such as the three shown in the drawings, one fisherman can very easily increase his catch without running into such difficulties as fouled lines and without the need for taking excessive time to bring in the fish, rebait the hook and set the line out again.

When the main support 1 is pivotally secured to the boat by clamp 3 the entire device may be pivoted, as desired, so that one of the outermost rods may be brought near the side of the boat and thus facilitate landing larger fish.

As stated above the precise angles of the axes of the hinges may be varied, and indeed should be varied depending on the dimensions and locations of various parts of the device as stated above. As shown in the drawings, the rods when extended for fishing form an angle of approximately 45° with the axis of the main support member 1, and the axes of hinges 17 and 18 are approximately 30° to the axis of the cross member 10 and are also at an angle of approximately 60° with the axis of the main support 1. Thus the rods when extended are at an angle of about 15° to a normal to the axis of the hinge, and when folded for carrying are at an angle of about 15° to the axis of the main support. Clearly if a longer cross member 10 is employed, possibly for mounting additional rod support members, or if longer rods are employed, or if a longer main support member is used, the angles of the axes of the hinges should be altered accordingly so that the rods will, when extended, take the desired divergent positions and when folded will form a compact arrangement for transport. Also it will be understood that the center fishing rod 16 shown in the drawings may be eliminated if desired so that an even number of rods, say four, spaced from the axis of and on opposite sides of the main support may be used instead of the three as shown. In this case all the rod support members will be attached to the cross member by angled hinges in the manner shown for rod support members 11 and 12. When more rods are to be used, it will be clear that the length of the reel support member 6 might have to be increased to accommodate the extra reels to prevent conflict with the operation of the other reels.

What is claimed is:

1. A multiple pole fishing device comprising a main support member, means for removably attaching said support member to a boat, a cross member secured to and extending transversely of the outer portion of said main support member, a plurality of rod support means located in spaced relation along said cross member, each rod support means being provided with an opening for removably receiving a fishing rod, reel support means secured to the main support member, hinge means for hingedly mounting each of said rod support means on said cross member to permit each rod to be lifted to a vertical position and folded back onto the device when desired, the axis of each hinge means being at an angle to the axis of said cross member and to the axis of said main support member such that said rod support means will position the fishing rod outwardly and divergently while fishing at a substantial angle to the axis of the main support member, and, when folded back upon the main support member for easy transport, the fishing rods will form a substantially lesser angle with the axis of the main support member.

2. A fishing device as claimed in claim 1 wherein said rod support means may have openings of different size for receiving rods of different diameters.

3. A fishing device as claimed in claim 1 wherein two rod support means are provided, each at one end of said cross member.

4. A fishing device as claimed in claim 3 wherein the rod support means support fishing rods, when extended, at an angle of about 45° to the axis of the main support member and, when folded, at an angle of about 15° to the axis of the main support member.

5. A fishing device as claimed in claim 1 and further comprising reels mounted on said reel supporting means in spaced relation on both sides of said main support member, the axes of said reels being at an angle to the axis of said main support member.

6. A fishing device as claimed in claim 1 and further comprising a central rod support means hingedly mounted on the outer end of said main support member for supporting a central fishing rod coextensively with said main support member.

7. A fishing device as claimed in claim 6 and further comprising a reel mounted on said main support member for use with said central fishing rod.

* * * * *